3,047,620
PRODUCTION OF TEREPHTHALIC ACID FROM TOLUENE

Curtis G. Christian, Anaheim, Calif., assignor to Union Oil Company of California, Los Angeles, Calif., a corporation of California
No Drawing. Filed Apr. 5, 1954, Ser. No. 421,202
6 Claims. (Cl. 260—522)

This invention relates to methods for producing benzene polycarboxylic acids, especially terephthalic acid, from an inexpensive and plentiful raw material, i.e. toluene. More specifically it concerns certain advantageous procedures whereby toluene may be partially alkylated and then oxidized to yield a mixture of carboxylic acids which is rich in terephthalic acid and other acids, mainly trimellitic acid, which in turn may be easily converted to terephthalic acid by decarboxylation. The mixture of acids obtained by oxidation is also characterized by the ease with which it may be resolved into its pure components by simple water extraction, thereby avoiding certain difficult isomer separation problems which have heretofore hampered the economical production of terephthalic acid.

Broadly stated, the process consists in first mono-alkylating toluene under conditions designed to favor formation of the para-alkyl toluene, continuing the alkylation under the same or different conditions designed to favor selective further alkylation of ortho- and meta-alkyl toluenes, and then oxidizing the total alkylate under usual conditions, e.g. with nitric acid, until substantially all the alkyl groups are oxidized to carboxyl groups. The alkylating agent should contain at least 2 carbon atoms, and should be capable of introduction onto the benzene ring under non-isomerizing, and non-polymerizing conditions. The preferred alkylating agent is propylene. The final oxidation product is found to consist almost exclusively of terephthalic acid and trimellitic acid, and since the former is very insoluble in water while the latter is highly soluble, a simple and economical separation may be effected.

A primary object of this invention is to provide economical methods for converting toluene to terephthalic acid while avoiding as far as possible the formation of less valuable by-products. Another object is to provide methods for alkylating toluene whereby maximum proportions of para-isomers are produced. A specific object is to avoid difficult and expensive isomer-separation problems in the production of terephthalic acid. A broader object is to provide a more economical, plentiful and easily isolable raw material for terephthalic acid than has heretobefore been utilized. Still another object is to provide economical methods for the recovery of by-products from the process, e.g. isophthalic acid. Still further objects include the provision of techniques which will reduce corrosivity, heat requirements and process equipment to practical minimum values. Other objects and advantages will be apparent to those skilled in the art from the more detailed description which follows:

The aromatic dicarboxylic acids are highly important industrial raw materials by virtue of their use in the manufacture of polymeric esters for resins and synthetic fibers, monomeric esters for plasticizers, solvents and similar materials.

Of these acids, terephthalic acid is at present the most valuable, mainly because of its use in the manufacture of polymeric ester for synthetic fibers such as Dacron. In the past, terephthalic acid has generally been manufactured by the controlled oxidation of pure para-xylene. This process is economically undesirable in that it requires as the starting material substantially pure para-xylene, which is difficult to separate from meta-xylene. Alternatively, a mixture of isomeric xylenes may be oxidized to produce a mixture of the corresponding dibasic acids i.e. ortho-phthalic, isophthalic and terephthalic acids. Usually the oxidation product is contaminated with small amounts of benzoic acid and/or toluic acids. Benzoic, toluic and ortho-phthalic acids may be easily removed by solvent extraction with water. However, the separation of the remaining isophthalic acid from the terephthalic acid is more difficult and expensive. The previously known solvent extraction techniques involve the inherent disadvantage that the acids are very slightly soluble in the ordinary, economically desirable solvents. Other methods of separation may be employed such as selective esterification, but they do not generally effect a sharp separation, and give low yields of the pure product.

The present invention takes an entirely new approach to the production of terephthalic acid. The toluene employed as starting material may be easily isolated by fractional distillation from the aromatic hydrocarbons obtained for example by solvent extraction or azeotropic distillation of certain gasolines. The preferred gasolines are those obtained by the catalytic reforming or hydroforming of cracked and/or straight-run gasolines, preferably naphthenic gasolines. Such reformed gasolines ordinarily contain from about 40–60 volume-percent of aromatic hydrocarbons which may be easily separated from the non-aromatics by extraction with e.g. ethylene glycol, thiodipropionitrile, oxydipropionitrile, iminodipropinitrile, or any of the well-known selective solvents for aromatics. The toluene contained in the aromatic extract boils at 110° C. while the nearest homologs, benzene and xylenes, boil at 80° and about 138° C., respectively. The isolation of toluene is therefore readily achieved, and since the proportion by volume of toluene in the aromatic extract is ordinarily about 6–10 times that of the p-xylene, it will be readily apparent that toluene is potentially a much more plentiful and economical raw material than p-xylene.

Instead of first separating the total aromatic content of the gasoline, and then fractionating to obtain toluene, a narrow-boiling toluene-containing cut, boiling at e.g. 110°–115° C. may first be isolated and then treated to separate the toluene from the non-aromatics. The latter separation may be achieved by solvent extraction, or by azeotropic distillation with e.g. methyl-ethyl ketone, nitromethane, or any other material which is capable of azeotroping the paraffins overhead.

Alternatively, instead of isolating pure toluene, the gasoline may simply be fractionally distilled to obtain a cut boiling e.g. from 105°–115° C., and containing about 30–60% by volume of toluene, the remainder being largely paraffins. This entire cut may be subjected to alkylation, in which case the paraffins function as an inert diluent. The resulting alkylate may then be fractionated to obtain a mono-alkylated middle cut, a poly-alkylated bottoms, and the total overhead, consisting mainly of the original paraffins plus unreacted toluene, may be recycled back to the gasoline stream.

The alkylation of toluene has been studied in the past, but insofar as I am aware no one has succeeded in mono-alkylating toluene to obtain exclusively, or even predominantly, the para-isomer. For producing terephthalic acid, the para-isomer is most highly desired. However, in most cases a mixture of isomers is produced wherein the concentration of para-isomer is at most about 35 mole-percent. The resolution of such mixtures presents even greater difficulties than the resolution of equilibrated xylenes. I have now found that under certain conditions of alkylation it is possible to: (1) produce an initial mono-alkylated product which is 45–55 mole-percent para-isomer; and (2) further alkylate the initial product to produce a secondary product wherein the ortho- and meta-isomers have been selectively converted to dialkyl toluenes, thereby leaving predominantly the para-monoalkyl toluene. Moreover, the dialkyl toluenes formed are found to consist almost wholly of 1,2,4-isomers. This final mixed alkylate is a valuable and versatile intermediate. It may, if desired, be easily separated by fractional distillation to obtain a para-dialkyl benzene, and a higher-boiling 1,2,4-trialkyl benzene, both of which are valuable intermediates for terephthalic acid. Alternatively, the combined alkylate may be oxidized to produce a mixture of terephthalic acid and trimellitic acid which may be easily resolved by extraction with water. In the latter case, the resulting aqueous extract of trimellitic acid may be mono-decarboxylated to produce a mixture of dibasic acids which contains at least a substantial proportion of terephthalic acid, plus some isophthalic acid. A still further alternative consists in subjecting the entire oxidate to mono-decarboxylation, in which case the terephthalic acid is unaffected and the trimellitic acid is converted to terephthalic acid and isophthalic acid. In this latter case, substantially no separation steps are involved until the final decarboxylated product is obtained. Since that product contains from about 50-70 mole-percent terephthalic acid and only about 30-50 percent isophthalic acid, i.e. since it is rich in terephthalic acid, it is economically feasible to purify it, whereas the oxidate from equilibrated xylenes, which contains only about 20-30% terephthalic acid, often will not economically sustain the purification thereof.

The preferred alkylation procedure consists in treating toluene in the presence of mild alkylation catalysts, under non-isomerizing, non-polymerizing conditions, with an olefine containing from 2 to 4 carbon atoms, preferably propylene. The operative catalysts comprise mainly phosphorus pentoxide, or combinations thereof with modifiers, e.g. mildly acidic alkylation catalysts which do not form definite complexes with the hydrocarbons, and do not cause isomerization or trans-alkylation under mild conditions. The phosphorus pentoxide should be substantially anhydrous since phosphoric acid is not as active for the alkylation, and does not give the desired high ratios of para-isomer. The phosphorus pentoxide catalysts may be employed alone, or supported on a carrier such as activated carbon, silica gel, activated clays and the like. Suitable acid modifiers include for example p-toluene sulfonic acid, arsenic trioxide, o-phthalic acid etc. Particularly valuable combinations consist of phosphorus pentoxide and p-toluene sulfonic acid, or phosphorus pentoxide and arsenic trioxide. However, phosphorus pentoxide, either alone or on a carrier, is almost equally effective in producing a large initial proportion of para-isomer, and in selectively catalyzing the further alkylation of ortho- and meta-isomers to produce 1,2,4-trialkyl benzenes. Any of the catalysts which contain as the principal active ingredient phosphorus pentoxide are found to be highly active in the selective alkylation desired.

When employing catalysts of the above type, the reaction temperatures may range between about 20° and 110° C., and preferably between about 75° and 100° C. In batch-wise operation at these temperatures, it will be found that substantial conversion of the toluene, e.g. 40-90% will take place within a space of about 1-24 hours. At temperatures appreciably higher than 110° C., it is found that substantial polymerization of propylene and/or isomerization of the alkylated products is likely to occur. Pressures may range from atmospheric to 1000 p.s.i.g. or higher.

The amount of catalyst is not in itself a critical factor, and the weight-ratio of toluene to catalyst may therefore range between about 1/1 and 100/1 or higher. However, there is an interrelationship between the temperature of alkylation and the amount of catalyst employed. At the higher alkylation temperatures, smaller proportions of catalyst should be employed, while at lower temperatures the larger proportions of catalyst may be employed. Proper adjustment of these variables substantially improves the selectivity of alkylation.

The process may be carried out in either continuous or batch-wise manner. In continuous operation it is definitely preferable to support the catalyst on a carrier so that the finely divided phosphorus pentoxide will not be carried out of the reactor with the product. Suitable ratios of phosphorus pentoxide to carrier may range between about 1/1 and 1/50 by weight. The carrier may be suitably ground or pelleted to meet the desired flow conditions in the reactor. Granular carriers ranging between about 5 and 50 mesh may suitably be employed.

While the above-described catalysts, or others similar thereto, are required for the initial selective monoalkylation stage, operative catalysts for the later stages of alkylation, i.e. polyalkylation, may be selected from a wider group. In general any Friedel-Crafts type alkylation catalyst may be employed in the latter stages, e.g. aluminum chloride, hydrofluoric acid, sulfuric acid, boron trifluoride, $HF\text{---}BF_3$, zinc chloride, ferric chloride, $AlCl_3\text{---}HCl$, $BF_3$-etherate etc. Best results are generally obtained however when a single catalyst, e.g. phosphorus pentoxide, is employed throughout.

It is well known in alkylation reactions that the nature of the alkylating agent is a critical factor, in addition to the effects of the catalyst. In the alkylation of aromatic compounds, there are apparently at least two principal factors which determine the orientation on the ring of the entering alkyl groups. One factor is the inherent electro-chemical influence of the substituents already on the ring. For example an alkyl group is known inherently to favor the further substitution of the ring in the ortho and para positions. Other substituents such as nitro groups are known to favor the formation of meta isomers. However, the electro-chemical orienting effect of the groups already on the ring is not the sole determinant as to the course of further alkylation. Another major factor is the steric configuration and size of the entering group, and the steric effects of the groups already present. For example if a benzene ring is already substituted by one tertiary butyl-group, the ortho positions are sterically blocked so that further substitution takes place almost exclusively on the para position. This effect is not obtained however with toluene. The situation is further complicated by the fact that the higher alkyl groups for example ethyl, propyl, butyl and isobutyl are inherently easier to introduce onto the ring than is the lowest member of the alkyl series, methyl. It is in fact very difficult to introduce methyl groups into the ring under conditions which do not also effect isomerization. The same applies to a lesser extent to ethyl groups. In view of all these factors, it is usually very difficult to predict the exact results which will be obtained under a given set of alkylation conditions.

In the present case it has been found that propylene gives the best results in obtaining the desired isomer distribution. The larger butyl or isobutyl groups may be introduced through the use of butene, or isobutene. Higher alkyl groups may be similarly introduced, but are generally not preferred if the products are to be employed as oxidation raw materials. All factors considered, the preferred alkylating agent consists of propylene, or gases which are rich in propylene, such as may result from the depropanizing of petroleum fractions and the like. Such gases ordinarily contain from about 40% to 70% by volume of propene, with minor proportions of other olefins and paraffins.

The alkylation should be continued under the specified conditions until each mole of toluene converted has reacted with between about 1.1 and 2.5 moles of propylene, preferably between about 1.3 and 2.0 moles. At this stage of alkylation there is an optimum relationship between the proportion of para-isomer in the mono-alkylate fraction, and the total amount of dialkylated and trialkylated toluene, based on the maximum total terephthalic acid obtainable by oxidation and decarboxylation of the alkylate. This stage of alkylation is ordinarily reached when about 40% to 90% of the toluene has been alkylated, or after about 2 to 12 hours contact time.

A very effective manner of carrying out the invention batch-wise consists in bubbling the propylene through the liquid toluene in the presence of the catalyst. It may be desirable to agitate the mixture to provide suitable contact between catalyst and reactants, and slight heating may be desirable although the reaction is in itself exothermic. In case a continuous process is desired, the toluene may be circulated in liquid phase downwardly through a bed of the catalyst while propylene is bubbled countercurrently therethrough.

The alkylation product from any of the above-described operations may be separated into the desired fractions by fractional distillation. The principal fractions so obtained consist of toluene boiling at 110° C., the cymenes boiling at about 175° C., and the diisopropyl toluenes boiling at about 205° C. A small amount of trialkylated toluene may also be formed. It will be apparent however from the above discussion that for the purpose of producing terephthalic acid it is only necessary to remove the unreacted toluene. The remaining cymenes and/or the 1,2,4-trialkyl benzenes are then subjected to oxidation to oxidize the alkyl side chains to carboxyl groups. The trialkyl toluene may also be separately or simultaneously oxidized to form a benzene tetra-carboxylic acid.

The oxidation of these fractions may be carried out by procedures which are generally well-known in the art. For example they may be oxidized in the liquid phase with 30-40% nitric acid at temperatures between about 150° and 300° C., either with or without added air or oxygen. Alternatively, an initial oxidation may be carried out with air in the presence of for example 1% of a cobalt naphthenate catalyst, or other Group VIII metal salt at 100-175° C. for three hours, and the resulting monocarboxylic acids may then be further oxidized with nitric acid at 175-250° C. in the absence of catalyst. Alternatively, the hydrocarbons may first be oxidized with air as described, and the oxidation of the mono-carboxylic acids completed by heating with sodium bisulfite and hydrogen sulfide in the presence of water at a temperature between about 500° and 700° F. The latter method of oxidation is more particularly described in the copending application of Art C. McKinnis, Serial No. 377,399, filed August 31, 1953. However, the invention is not restricted to the particular method of oxidation since any method may be employed which is capable of oxidizing substantially all the alkyl groups contained on the ring without causing appreciable oxidation of the ring.

The trimellitic acid which is produced from the oxidation of 1,2,4-trialkyl benzenes may be mono-decarboxylated, either in the presence or absence of terephthalic acid, whereby at least about 40 mole percent of the trimellitic acid is converted to terephthalic acid. This decarboxylation may for example be carried out by heating the trimellitic acid under pressure with water at temperatures between about 250° and 400° C., and preferably between about 275° and 350° C. This procedure produces a mixture which is approximately 40 mole-percent therephthalic acid and 60 mole-percent isophthalic acid. Alternatively, the trimellitic acid may be decarboxylated by heating in the presence of mercuric salts, preferably a mercuric halide such as mercuric chloride. This latter procedure results in the selective removal of the 2-carboxyl group, apparently through the intermediate formation of anhydro-hydroxymercuric derivatives. The resulting product is found to be about 75% terephthalic acid and 25% isophthalic acid. This particular decarboxylation method is more particularly described in the copending application of Art C. McKinnis, Serial No. 400,777, filed December 28, 1953. However, any method of decarboxylation may be employed which results in the formation of appreciable amounts of terephthalic acid.

The mixtures of terephthalic and isophthalic acid which are ultimately produced herein may be separated by any convenient procedure, as for example by solvent extraction with water at temperatures between about 150° and 300° C. At these temperatures water exhibits considerable solvent capacity for isophthalic acid, e.g. about 10 grams per 100 ml. at 270° C., and the solubility of isophthalic acid is almost ten times that of terephthalic acid. Alternatively, the acids may be separated by solvent extraction with a mixture of a lower aliphatic alcohol and water at a lower temperature e.g. 75-150° C. For the latter separation the solvent may be for example 75-90 volume percent methanol and 10-25 volume percent water. They may also be separated by fractional crystallization from such solvents as hexamethyl phosphoryl amide, or dimethyl formamide and the like.

The invention may perhaps be more readily understood from the following examples which are however illustrative only.

EXAMPLE I

In order to compare the orienting effects of various catalysts for mono-alkylation, a series of batch experiments were carried out in liquid phase at atmospheric pressure utilizing gaseous propylene as the alkylating agent. The results were as follows:

Table 1

| Run No | Gms. Toluene | Catalyst | Temp. °C. | Time, Hrs. | Mole ratio, $C_3H_6/C_7H_8$ | Percent conversion Toluene | Percent Isomer dist. ortho | meta | para | Botts, gms. |
|---|---|---|---|---|---|---|---|---|---|---|
| 1 | 276 | 15 g. $P_2O_5$, 7 g. act. C | 40 | 1.5 | 0.66 | 27.5 | 38.6 | 15.3 | 46.1 | 11.2 |
| 2 | 270 | 15 g. $P_2O_5$, 7 g. act. C, 1 g. p-cresol | 80 | 2.0 | 0.83 | 64.0 | 30.9 | 14.3 | 54.8 | 64.0 |
| 3 | 276 | 25 ml. 48% $BF_3$-etherate | 100 | 2.0 | 0.83 | 12.2 | 42.4 | 22.2 | 35.4 | 9.0 |
| 4 | 460 | 100 ml. 85%, $H_3PO_4$ sat'd with $BF_3$ | 25 | 2.0 | 0.8 | 45.0 | 41.6 | 24.6 | 33.8 | 53 |
| 5 | 346 | 100 ml. conc $H_2SO_4$ | 5 | 1.5 | 0.55 | 35.0 | 47.5 | 19.8 | 32.7 |  |
| 6 | 346 | 50 g. $FeCl_3$ | 70 | 1.0 | 0.5 | 18.2 | 45.1 | 21.3 | 33.6 |  |
| 7 | 276 | 13.1 g. $AlCl_3$, 6.0 g. HCl | 0 | 1.5 | 1.3 | 53.0 | 34.0 | 25.0 | 41.0 | 168 |

In Table 1, the mole-ratio of propylene indicated represents the amount supplied, not necessarily the amount absorbed. It will be noted that in runs 1 and 2, using $P_2O_5$ as catalyst, the cymenes obtained were 46.1% to 54.8% para-cymene. In runs 3 to 6, employing typical Friedel-Crafts type catalysts, the cymenes were only 32.7% to 35.4% para-cymene. It will also be noted that in run No. 2, polyalkylation, as indicated by the large proportion of bottoms product, resulted in an increase in the ratio of p-cymene as compared to run No. 1. The large proportion of high-boiling product in run No. 7 indicates that substantial polyalkylation and/or polymerization occurred, also with an increase in the proportion of p-cymene. This indicates that $AlCl_3$—HCl catalyst, even at 0° C., causes considerable isomerization and/or polymerization, but it also shows that catalysts other than $P_2O_5$ are useful in the second phase of the alkylation for selectively alkylating ortho- and meta-cymenes.

EXAMPLE II

This example illustrates the results obtained when toluene is alkylated with propylene in the presence of $P_2O_5$, and the alkylation is continued until 1.2 moles of propylene per mole of toluene taken has been absorbed. This corresponds to about 1.4 moles of propylene per mole of toluene converted. The alkylation is carried out at 85° C. and atmospheric pressure. The catalyst consists of 10 gms. of phosphorus pentoxide supported on 10 gms. of kieselguhr, for 200 ml. of toluene. The resulting product, after 8 hours of alkylation, is filtered, washed with aqueous sodium bicarbonate and then with water, and finally is fractionally distilled to give the following products:

| | Gms. |
|---|---|
| Toluene | 21 |
| Cymene fraction (B.P. 170–180° C.) | 132 |
| Di-isopropyl toluenes, predominantly 1,2,4-substituted (B.P. 185° C.+) | 110 |

The cymene fraction is found to have the following isomer distribution:

| | Percent |
|---|---|
| p-Cymene | 69.2 |
| m-Cymene | 8.4 |
| o-Cymene | 22.4 |

By more exhaustive alkylation, a cymene fraction is obtained which is 85–90% p-cymene.

EXAMPLE III

The cymene fraction plus the di-isopropyl toluene fraction from Example II is combined and subjected to oxidation, first with air in the presence of 1% of cobalt naphthenate at 150° C. for 3 hours, and then with 30% nitric acid at 200° C. for 1 hour in the absence of catalyst. The solid oxidation mixture is then agitated and washed with 2 liters of cold water to remove the bulk of the trimellitic acid, and the resulting solution is set aside for subsequent treatment. The remaining solid material is then stirred with 1500 ml. of water at 100° C. for a few minutes and filtered. The filtrate contains substantially all of the ophthalic acid and most of the isophthalic acid resulting from the oxidation of o- and m-cymene. The final precipitate is washed with warm water, dried, and weighed. The product, weighing 109 gms., is found to be 96% pure terephthalic acid, the impurities being largely isophthalic acid.

The aqueous solution of trimellitic acid is then subjected to decarboxylation by heating in an autoclave equipped with a pressure relief valve for 1 hour at 325° C. The $CO_2$ evolved is continuously released. The contents of the autoclave are then allowed to cool to about 270° C., and filtered under pressure. The filter cake is washed with warm water and dried, yielding 40 gms. of 98% pure terephthalic acid, and the filtrate is found to contain 63 gms. of dibasic acid, mostly isophthalic acid.

The total terephthalic acid recovered in this example is 149 gms., representing a yield of 47% based on the original toluene taken, or 54.5% based on toluene consumed. Similar results are obtained when the combined oxidate is subjected to decarboxylation, without the preliminary separation of terephthalic acid.

EXAMPLE IV

The propylation procedure described in Example II is repeated except that instead of pure toluene, a hydrocarbon fraction boiling between 108–112° C. obtained by fractionation from a full range naphthenic gasoline reformate, and containing 42 volume-percent of toluene is employed. The alkylation is continued for 18 hours, until about 1.6 moles of propylene per mole of toluene converted has been absorbed. The resulting alkylate is then topped to remove paraffin hydrocarbons and unreacted toluene, and the total alkylated residue, boiling above 170° C., is oxidized under pressure in a stainless steel autoclave with 30% nitric acid at 190° C., while continuously bubbling air through the mixture. When the oxidation is complete, as evidenced by the substantial absence of $CO_2$ in the off-gases, the mixture is cooled to 20° C. and filtered. Excess nitric acid is removed from the solid by washing with small amounts of cold water.

The total solid oxidate is then subjected to decarboxylation by heating with 2 liters of water at 325° C. for 1.5 hours, while removing $CO_2$. The decarboxylation product is cooled to about 275° C. and filtered. The filter cake is washed with warm water and dried. The yield of 98% pure terephthalic acid is 71 gms., representing a yield of 58% based on the toluene converted. The aqueous filtrate is found to contain about 22 gms. of dibasic acid which is approximately 78% isophthalic acid and 17% ophthalic acid.

While in the above examples and description, specific materials and conditions have been discussed, it is not intended that the invention should be limited to such. Many variations will be apparent to those skilled in the art, and it is intended to include such variations within the scope of the claims.

I claim:

1. A process for producing terephthalic acid from toluene which comprises subjecting toluene to alkylation with propylene in the presence of an alkylation catalyst consisting essentially of phosphorous pentoxide, continuing said alkylation at between about 20° and 110° C. until between about 40% and 90% of said toluence has been alkylated and between about 1.3 and 2.0 moles of propylene per mole of toluene converted has been absorbed, and then terminating the alkylation, thereby forming a mixture of toluene, cymenes and 1,2,4-di-isopropyl toluenes, removing unreacted toluene from the reaction mixture, subjecting the remaining residue to oxidation to convert substantially all of the alkyl side-chains to carboxyl groups thereby forming a mixture comprising isophthalic acid, terephthalic acid and trimellitic acid, and thereafter subjecting said trimellitic acid to mono-decarboxylation by heating at a temperature between about 250° and 400° C. in the presence of water thereby forming further quantities of isophthalic acid and terephthalic acid, combining the isophthalic acid and terephthalic acid mixtures resulting from said oxidation step and said decarboxylation step, and recovering terephthalic acid therefrom.

2. A process as defined in claim 1 wherein said mono-decarboxylation step is performed in the presence of the isophthalic acid and terephthalic acid resulting from said oxidation step.

3. A process as defined in claim 1 wherein the isophthalic acid and terephthalic acid from said oxidation step are removed from the oxidation mixture prior to said mono-decarboxylation of trimellitic acid.

4. A process for producing terephthalic acid from a gasoline reformate which comprises subjecting said reformate to fractional distillation to isolate a fraction boiling between about 105° and 115° C., subjecting said isolated fraction to alkylation with propylene in the presence of a catalyst consisting essentially of phosphorus pentoxide, continuing said alkylation at between about 20° and 110° C. until between about 40% and 90% of said toluene has been alkylated and between about 1.3 and 2.0 moles of propylene per mole of toluene converted has been absorbed, and then terminating the alkylation, thereby forming a mixture of toluene cymenes and 1,2,4-di-isopropyl toluenes, distilling the reaction mixture to recover overhead unreacted toluene and paraffinic hydrocarbons from said reformate fraction, subjecting the residue to oxidation to convert substantially all of the alkyl sidechains to carboxyl groups thereby forming a mixture comprising isophthalic acid, terephthalic acid and trimellitic acid, and thereafter subjecting said trimellitic acid to mono-decarboxylation by heating at a temperature between about 250° and 400° C. in the presence of water thereby forming further quantities of isophthalic acid and terephthalic acid, combining the isophthalic acid and terephthalic acid mixtures resulting from said oxidation step and said decarboxylation step, and recovering terephthalic acid therefrom.

5. A process as defined in claim 4 wherein said mono-decarboxylation step is performed in the presence of the isophthalic acid and terephthalic acid resulting from said oxidation step.

6. A process as defined in claim 4 wherein the isophthalic acid and terephthalic acid from said oxidation step are removed from the oxidation mixture prior to said mono-decarboxylation of trimellitic acid.

References Cited in the file of this patent

UNITED STATES PATENTS

| | | |
|---|---|---|
| 2,141,611 | Malishev | Dec. 27, 1938 |
| 2,324,784 | Lieber | July 20, 1943 |
| 2,576,020 | Knops | Nov. 20, 1951 |
| 2,636,899 | Burrows et al. | Apr. 28, 1953 |
| 2,734,914 | McKinnis | Feb. 14, 1956 |

FOREIGN PATENTS

| | | |
|---|---|---|
| 63,987 | Netherlands | Aug. 15, 1949 |
| 515,706 | Belgium | Dec. 15, 1952 |

OTHER REFERENCES

Welsh et al.: J.A.C.S., 63 pages 2603–4 (1941). (Copy in Library.)

Malishev: J.A.C.S., vol. 57, pp. 883–4 (1935).